Figure 1:
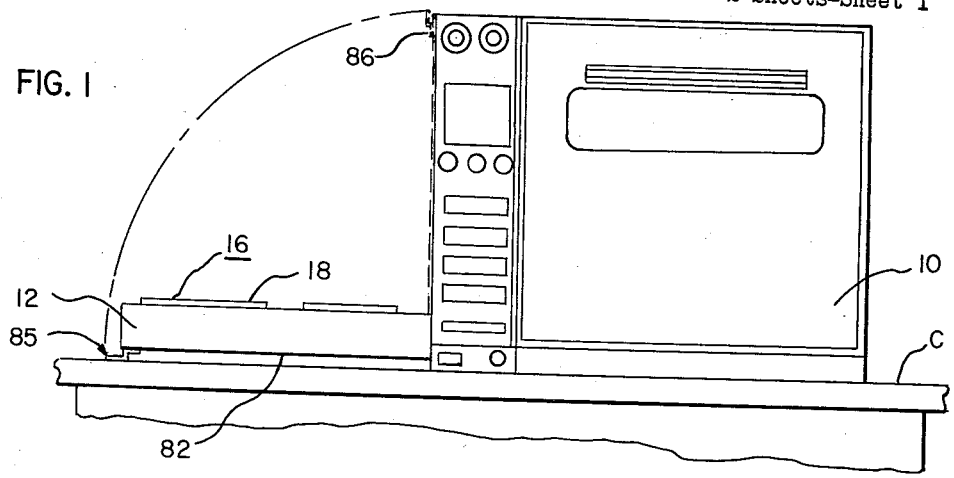

Nov. 20, 1962  R. L. COULTRIP  3,065,327
SURFACE COOKING UNITS
Filed Sept. 7, 1960
2 Sheets-Sheet 1

INVENTOR.
RAYMOND L. COULTRIP
BY
ATTORNEY

INVENTOR.
RAYMOND L. COULTRIP

United States Patent Office 3,065,327
Patented Nov. 20, 1962

3,065,327
SURFACE COOKING UNITS
Raymond L. Coultrip, Oak Park, Ill., assignor to General Electric Company, a corporation of New York
Filed Sept. 7, 1960, Ser. No. 54,540
8 Claims. (Cl. 219—37)

This invention relates to surface cooking units and more particularly to sub-structures for use with heating elements employed therein.

The recent trend in kitchen appliances has been to design the appliances with the "built-in" look utilizing surface cooking tops which retract or which fold away when not in use. In one instance, the surface cooking unit in its operative position is to either rest on a kitchen counter top or in the alternative be retained cantilever fashion with air space only below the cooking top structure. It is vital in these instances that the exposed surfaces of the structure surrounding the units, particularly the protruding sides and the bottom, be kept as cool as possible. Further, since the construction is quite compact and must be portable yet structurally sound, the structure cannot be one which will retain grease drippings in a manner difficult to clean, or in a location in which they may be exposed to temperatures above the flash point of the drippings.

To alleviate these difficulties the present invention has as its object to provide a surface cooking unit with means for shielding radiated heat from the structure surfaces therebelow.

Another object of the invention is to provide a surface cooking top including a plurality of individual heating elements, each element of which has associated therewith a radiant heat deflector and means for channeling grease drippings from the sub-structure under the element.

It is a further object of the invention to provide with each of a plurality of coiled surface heating elements a sub-structure including a heat reflecting pan, a radiant heat deflector and a means for channeling waste drippings out of the sub-structure.

The present invention contemplates the use of an oven structure with a cooking top mounted to the oven and pivotal between an operative position and a folded-away position. In the operative position the cooking top presents a horizontal surface with a plurality of individual coiled heating elements parallel to the top surface. The cooking top in this position also possesses a structure to allow the unit to be supported on a section of kitchen counter. In the folded-away position, the cook top is pivoted about an axis substantially comprising the lower edge of the adjacent oven wall. Folded away, the cooking unit fits within a suitable cutout in the oven side to rest with the cooking top surface substantially vertical and the base of the cook top structure forming the visible outer sidewall of the oven structure.

Within a cooking top such as that just described, there arise a number of precautions which must be followed and which are not usually encountered in cooking top usages. For example, in the presently described cooking top, it is essential that the kitchen counter top be shielded from the high temperatures generated by the heating units. Further, it is imperative that grease and drippings not be allowed to accumulate within the unit since such accumulations would contaminate the oven wall and the unit when it is folded away. Still further, since the unit is comparatively compact in construction, the structure must be such that cleaning of the internal components is not difficult. Also since the unit will be moved frequently between its two positions, all internal components must be firmly held in place so that they will not rattle or fall loosely about within the cooking top structure.

To effect these results, the invention provides for surface cooking operations on a cooking top structure which has a depth of less than three inches. Co-planarly or at least parallel to the upper cooking surface is the coiled heater. Beneath this, and coaxial to the heater is an open-bottomed, bowl-shaped reflector pan of the generally known type. Spaced below and parallel to the open bottom is a radiant heat shield in the form of a highly polished disc having a surface area greater than the opening in the reflector pan. This disc is mounted above a spillage deflector in a manner to minimize heat transfer from the disc to the deflector pan. This deflector is shaped like a serving plate with an inverted frusto-conical sidewall terminating in a horizontal flange or lip. The open bottom of the deflector coincides with a like opening in the base of the cooking top structure. The base itself provides structure which maintains a space relationship between the base and the counter top.

By utilizing these components, the reflector pan and the polished disc intercept all radiant heat rays directed downwardly. Due to disposition of the disc, little of the heat intercepted thereby is transmitted to the deflector pan and the unit base. This aids in keeping the counter top at a safe temperature. Further by the previously mentioned spatial relationships, the energized heating unit generates upwardly flowing air currents which are drawn by the hot air draft through the unit base and into the opening below the heater to strike the heat shield thus cooling the shield. Also any spillage or drippings from the cooking operation will roll down the wall of the reflector, onto the disc and down the disc flange into the deflector. From the deflector, these drippings may flow through the deflector and base openings onto the cool counter top from which they are easily cleaned. All grease trapping pockets have thus been eliminated, reducing the problem of cleaning the unit internally, and eliminating any possibility of floor fires from overheated grease.

Figure 2:
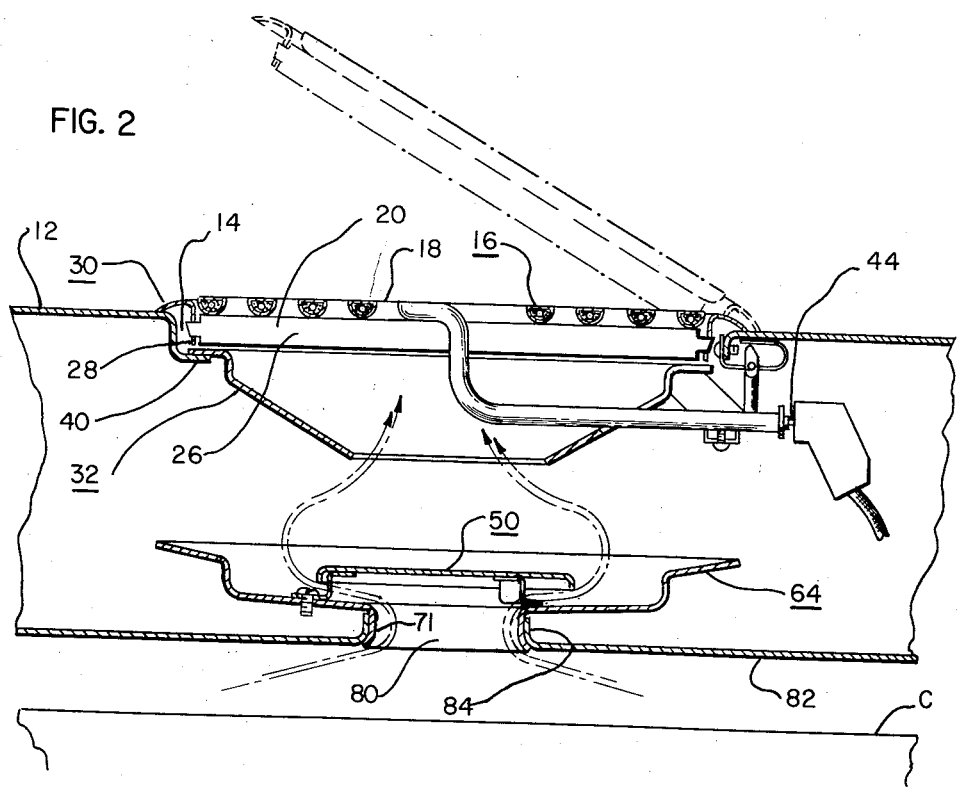
Figure 3:
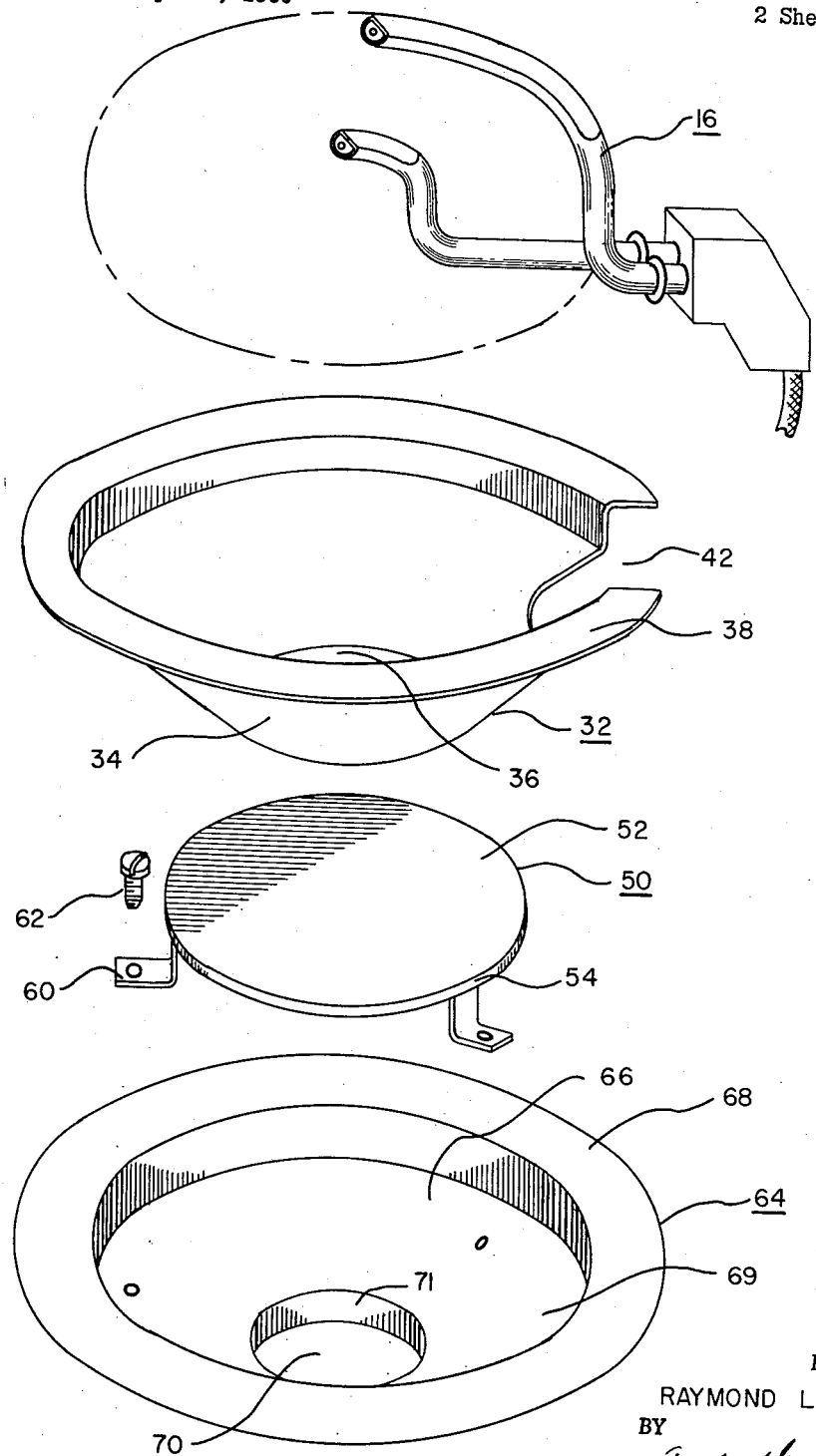

The invention both as to its organization and principle of operation, together with further objects and advantages thereof, will best be understood by reference to the following specification taken in connection with the accompanying drawings in which:

FIG. 1 is a front elevational view of a cooking surface or cook top and its mounting to an oven according to my invention, FIG. 2 is a side sectional view of a sub-structure for one of the heaters of FIG. 1, and FIG. 3 is an exploded perspective view of the sub-structure of FIG. 2.

In FIG. 1 there is shown the oven 10 with its appended cooking top 12. The structure may be as illustrated in Sandin Design Patent 182,084 granted February 11, 1958, and assigned to my present assignee. The cooking top in its operative position rests on a kitchen counter top C and may be pivoted to a folded-away position shown dotted in FIG. 1. Cooking top 12 includes within suitable circular openings 14 a plurality of surface cooking units 16 (FIG. 2). Each unit includes one or more heating elements which may be of the sheathed type having a coiled resistance conductor housed in a metallic sheath and supported in uniformly spaced relationship to the sheath by a highly compacted mass of suitable heat-conducting and electrically insulating material such as powdered magnesium oxide. Heating elements of this type may be constructed as described in U.S. Patent 2,094,480 issued to O. G. Vogel on September 28, 1937. Conventionally such heating elements are arranged to form flat spirals of several convolutions nested within one another to provide a circular heat generating surface 18. The heating elements of the unit are supported conventionally from beneath by a support structure or spider 20, which comprises a plurality of arms 26 extending beneath the convolutions of the heater to support the element thereon. The extremities of these arms may be fitted through suitable slots in the depending flange or sidewall 28 of trim ring 30. Trim ring 30 generally comprises an annular ring of polished metal which rests on the upper surface 16 of the cooking top about the circular opening 14, thereby firmly supporting the cooking unit and establishing the heat-generating surface 18 horizontally with respect to cooking top 12.

Beneath each of the cooking units there is a substructure which rests spaced above counter top C as shown in FIGS. 2 and 3. This sub-structure includes first a bowl-shaped reflector pan 32 of highly polished metal. This reflector of generally known design includes a spherical body 34 with an opening 36 at its lower central portion. The reflector also includes a horizontal flange or lip 38 which is designed to rest upon the inturned flange 40 which defines the circular opening 14. The reflector also has a cutout 42 to accommodate the passage of terminals 44 which in the usual way are stepped away from the coil proper for connection to an electrical current source.

Spaced a distance below the reflector pan is the radiation shield 50. This shield comprises a highly polished circular metal disc 52 having a downturned flange 54. The circular area of the disc is more than sufficient to cover the opening 36 in the reflector lower section. The disc is spaced a distance below the reflector opening to allow the passage of air currents, and the free flow of spillage and grease, through the opening 36. The disc, therefore, is of sufficient area to intercept radiant energy directed downwardly from the heating elements and passing through opening 36; that is to say, all radiant energy which is not reflected by reflector pan 32. Thus the relationship of disc 52 and reflector pan 32 is such that disc 52 is an efficient heat shield, while permitting free passage of upwardly moving air currents, of cooking spillage and fluid drippings which may pass through opening 36. Spaced within flange 54 of the disc are mounting tabs 60. These tabs of which there are three, each comprise a stepped bracket, the upper end of which is secured as by welding or brazing to the shield 50 inwardly adjacent flange 54. The tabs at their lower step are secured by screws 62 to the base portion of deflector pan 64. By the use of the tabs, an air space is provided between disc 52 and the deflector pan. The deflector pan 64 is generally similar in shape to the reflector pan 32, having a substantially spherical body 66 terminating at its upper extent in a horizontally directed annular flange 68. It can be seen that the opening 69 defined by the inner margin of flange 68 circumscribes disc 52 by a substantial margin, whereupon the pan 64 will entrap all fluid currents and drippings flowing over disc 50, and channel these fluids downwardly to its open-bottom 70. The open-bottom 70 includes a downwardly directed neck 71 which is fitted within a circular opening 80 in base 82 of the cooking top structure. Open-bottom 70 and opening coincide in extent and are positioned in mutual registry. Opening 80 includes an upwardly directed cylindrical sidewall 84 which telescopes within neck 71 and in assembly neck 71 is spun over against the sidewall 84 to insure a grease-tight joint.

It can be seen in FIG. 2 that deflector pan 64 is firmly affixed to the base 82 by the spun joint and that the shielding disc is securely affixed to the deflector pan. Reflector pan 32 is held in place by the pressure of the heating unit resiliently resting thereon. The heating unit is connected to the cooking top in any conventional manner which allows the heating element to be pivoted upwardly at its free end for cleaning out the assembly. For example, the arrangement may be as shown in Vallorani U.S. Patent 2,662,157 granted December 8, 1953. The reflector pan may then be removed exposing the disc 52 and the deflector pan 64 for cleaning.

Further it can be seen from FIG. 1 that the cooking top does not rest directly on the counter top but rests on the inverted L shaped bracket 84. Bracket 84 includes a leg which rests on the counter top and a top strip 86 which is secured suitable to the cooking top base. This top strip has its free end extending outwardly to form a handle by which the cooking top may be firmly grasped for raising or lowering.

The cooking top is operative within the position shown fully in FIG. 1. In this operative position, the cooking or heating surfaces 18 extend horizontally in the generally known manner. The cooking top may be pivoted about a hinge mechanism at the lower edge of the oven. When the cooking top is swung to its inoperative position about the hinge axis 90, the L bracket 84 follows the arc shown dotted in FIG. 1 to the folded-away position shown also dotted in this figure. Naturally suitable electrical interlocks may be provided to shut off any units which are energized while the cooking top is being folded away. Such interlocks are not within the area intended to be covered by this patent.

Now, considering the operative position of any heater in the unit, the heating element is individually energizeable in the known manner. Heat is directed by the sheathed heater in all directions. In the downward directions, with which we are concerned in this specification, much of the radiated energy strikes the sidewall of reflector pan and is re-radiated. Radiant energy passing through opening 36 strikes disc 52 and is re-radiated upwardly. By this combination of reflector and disc, all downwardly directed heat rays are intercepted and cannot strike the deflector pan 64 or the base of the cook top.

As the heater heats the air about it, a "chimney effect" is induced within the structure, whereupon a cool air circulation path (indicated by arrows in FIGS. 2 and 3) may be followed from the ambient atmosphere, to the space under the cooking top through the coincident openings 80 and 70 in the base and deflector pan respectively, around the periphery of the disc, through the opening 36 in the reflector pan and up to and through the heating element sheaths. This air current tends to cool disc 52 as it directly strikes the underside of the disc and will carry away a portion of the heat transmitted to the disc. It should be noted that the only metallic heat conduction paths leading from the disc are those formed by the three small tabs 60. As a result, little heat is transmitted by the disc conductively which tends to aid in keeping the cook top base at a safe low temperature.

Further analysis of the heating element substructure shows that grease or other fluid drippings will drain out of the cooking top onto the counter top. Such drippings have been partially cooled in the process. Assume that grease is dripping from an object being heated on heating element 16. This grease will roll down the sidewall of the reflector pan and cascade onto the top of disc 52 from which the grease will pass to the deflector pan and through the coincident openings 70 and 80. In this way any drippings remaining in the sub-structure will either be on the inside of the reflector pan, on the top of the heat shielding disc or along the inner sidewall of the deflector pan. These are all readily accessible surfaces which need not be emptied but merely rubbed clean. Excess grease will flow through the previously described pattern and onto the counter top where it can readily be cleaned off. Thus it will seen that all grease trapping pockets have been eliminated. No grease accumulations can occur within the cook top in its operative position to flow into inaccessible locations when the cooking unit is folded away.

While there has been described what is at present thought to be the preferred embodiment of the invention, it will be understood that various modifications may be made therein and it is intended to cover in the appended claims all such modifications as fall within the true spirit and scope of the invention.

What is claimed is:

1. In a surface cooking unit adapted to be stored in a closed-away position within a mounting structure and to be moved to an operative cooking position exterior of said mounting structure, and in which said unit includes a heating element having passages therethrough; a heat-reflecting and drippage diverting sub-structure for said heating element, comprising a disc-shaped baffle member of heat-reflecting and grease-impervious material positioned in a horizontal plane beneath said heating element and co-axial therewith, a grease-impervious open-bottomed bowl structure, a base plate for said surface cooking unit in spaced parallel relation therewith, said base plate being apertured circularly co-axial with said heating element, means for securing said bowl structure to said base plate with the respective apertures thereof in mutual registry, and means for securing said baffle within said bowl structure in inwardly spaced relation to the sidewall thereof and in axially spaced covering relation to the opening in said bowl structure, whereby to intercept radiant heat from said heating element while permitting spillage from a cooking operation to pass through the registering openings of said bowl structure and said base plate.

2. In a surface cooking unit adapted to be stored in a closed-away position within a mounting structure and to be moved to a position exterior of said mounting structure for heating thereof, said unit including a coiled resistance heater having passages between the convolutions thereof; a sub-structure for said heater while in said exterior position, comprising a disc-shaped baffle positioned in a horizontal plane beneath said coiled heater and co-axial therewith, said baffle positioned to divert any drippings which result from an operation of said heater and which pass through the heater passages, an open-bottomed bowl secured in spaced-away relation below said disc and co-axial thereto for channelling drippings diverted by said disc further downwardly, mounting means for maintaining said disc-to-bowl spaced-away relation, said mounting means comprising a plurality of tabs secured at one end to the periphery of said disc and at the other end to said bowl with openings between said tabs to allow passage of drippings diverted by said disc, and a base plate for said unit, said base plate apertured circularly co-axial to said heating coil to allow drippings from said bowl to flow through said base plate aperture and out of said unit.

3. In a surface cooking unit adapted to be stored in a folded-away position within a mounting structure and to be moved to a cooking position exterior of said mounting structure, said unit comprising structure providing spaced parallel wall means respectively providing a cooking surface and a supporting base plate, a plurality of substantially identical heating elements individually disposed within apertures in said cooking surface, said heating elements being operative individually to heat cooking vessels disposed thereon; identical sub-structures for each of said heating elements each comprising an imperforate disc-shaped baffle positioned in a horizontal plane within said cooking unit structure beneath said heating element and in axially spaced relation thereto, said base plate being aperture circularly beneath each of said cooking surface apertures, means including spaced legs secured within said structure for securing each said baffle in vertically spaced covering relation to the adjacent base plate aperture, and means providing for the passage of air currents upwardly through said base plate apertures, about and past respective baffles, and through the cooking surface apertures when the respective heating elements are energized.

4. In a surface cooking unit adapted to be stored in a closed-away position within a mounting structure and to be moved to a horizontal operative position exterior of said mounting structure, and which includes a plurality of coiled surface heaters adapted to be energized individually, wherein said cooking unit in the operative position comprises an upper cooking surface with said heaters protruding therethrough, and a base plate spaced away from said cooking surface; an individual sub-structure for each of said heaters, each said sub-structure positioned beneath a heater when the unit is in its operative position; each said sub-structure comprising a disc-shaped radiation-baffling shield positioned in a horizontal plane beneath said coiled heater and co-axial therewith, a radiant heat-reflecting open-bottom bowl secured in spaced-away relation above said disc and coaxial therewith, mounting means for positioning said disc, said mounting means comprising a plurality of low thermal conductivity tabs secured from about the periphery of said disc to connection with said base plate and including air passage openings between said tabs, a circular opening in said base plate individually co-axial to each of said discs, whereby each said bowl and disc combinedly intercept all downwardly directed heat rays from reaching the openings in said base plate, and means forming air current paths through said base plate openings for directing said air currents to the underside of said discs to thereby cool said discs.

5. In a surface cooking unit adapted to be stored in a closed-away position within a mounting structure and to be moved to an operative heating position exterior of said mounting structure, and said unit comprises a plurality of surface heating elements spaced about said unit and operative individually to heat objects thereon; a sub-structure for each of said heating elements when said unit is in its operative position comprising a disc shaped baffle positioned in a horizontal plane beneath the adjacent heating element, a dripping deflector comprising an open-bottomed bowl secured in spaced-away relation below said disc, mounting means for maintaining said spaced-away relation, said mounting means comprising a plurality of spaced apart tabs secured at one end about the periphery of said disc and at the other end to said bowl to form a plurality of air passages between said bowl and disc, a base plate for said heating element, said base plate apertured circularly below said heating element, said aperture coincidental with the open-bottom of said bowl, and means for providing an air passage beneath said cooking unit whereby air currents are stimulated for circulation through said aperture and said openings to thereby flow about the sides of said disc.

6. In a surface cooking unit adapted to be stored in a closed-away position within a mounting structure and to be moved to a horizontal operative cooking position exterior of said mounting structure, and which includes a plurality of surface heaters adapted to be energized individually, an individual sub-structure for each of said heaters positioned below the heater when the unit is in its horizontal position, comprising a radiation shielding disc positioned in a horizontal plane beneath said coiled heater, a radiant heat reflecting open-bottom bowl secured in spaced-away relation above said disc, mounting means for positioning said disc therbelow, said mounting means comprising a plurality of low thermal conductivity tabs secured about the periphery of said disc for mounting to said unit to provide air passage with openings therebetween, said bowl and said disc combinedly intercepting all of the downwardly directed radiant heat rays emitted by said heater to prevent said rays from extending beneath said disc, and means for channelling air currents into said substructure against the underside of said disc to thereby cool said disc.

7. In a surface cooking unit adapted to be stored in a close-away position within a mounting structure and to be moved to an operative position exterior of said mounting structure, and including a plurality of individual coiled surface heaters in said unit; a radiation shielding disc positioned in a horizontal plane beneath each said coiled heater and co-axial therewith, a heat reflecting open-bottom bowl secured in spaced-away relation above each of said discs and co-axial thereto, each said bowl and said disc combinedly blocking all downwardly directed radiant rays from the heater above, mounting means securing each of said discs to the base of said unit and for maintaining an air space below each of said discs, each said mounting means comprising a plurality of spacers secured about the periphery of said disc with openings therebetween, said spacers comprising a plurality of poor heat-conduction paths from said disc to said base, said base apertured circularly beneath each of said heaters co-axial to each of said heating coils, sidewalls on each of said apertures positioned to direct said air currents against the underside of said disc thereabove.

8. In a surface cooking unit adapted to be stored in a closed-away position within a mounting structure and to be moved to an operative position exterior of said mounting structure, and including a plurality of individual surface heaters in said unit; a sub-structure beneath each of said heaters when in its operative position including: a radiation shield comprising a solid disc positioned in a horizontal plane beneath said heater in the unit operative position, a heat reflecting open-bottomed bowl secured in spaced-away relation above said disc in the unit operative position, said bowl and said disc combinedly blocking all downwardly directed radiant rays emitted by an energized heater, mounting means securing said disc to the base of said unit and for maintaining an air space below said disc, said mounting means comprising a plurality of tabs secured about the periphery of said disc with openings therebetween, said tabs of narrow cross-section to thereby provide a poor path for conduction of heat from said disc to said base, said base apertured circularly beneath said heater to allow drippage from said heater to flow through said openings and aperture, and further to allow air currents to flow in said sub-structure, and a sidewall on said aperture positioned to direct said air currents against the underside of said disc.

References Cited in the file of this patent
UNITED STATES PATENTS

| | | |
|---|---|---|
| 2,446,666 | Thompson | Aug. 10, 1948 |
| 2,738,411 | Sandin | Mar. 13, 1956 |